United States Patent
Seah et al.

(10) Patent No.: US 8,600,587 B1
(45) Date of Patent: Dec. 3, 2013

(54) SYSTEM AND METHOD FOR DETERMINING AN OBJECT THREAT LEVEL

(75) Inventors: Kirschen A. Seah, Cedar Rapids, IA (US); Kevin M. Kronfeld, Cedar Rapids, IA (US); Jeffery A. Finley, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 541 days.

(21) Appl. No.: 12/884,018

(22) Filed: Sep. 16, 2010

(51) Int. Cl.
*G06F 7/00* (2006.01)

(52) U.S. Cl.
USPC ................ 701/10; 701/14; 701/415

(58) Field of Classification Search
USPC ..................... 701/10, 14, 415, 416
See application file for complete search history.

(56) References Cited

U.S. PATENT DOCUMENTS

| | | | | |
|---|---|---|---|---|
| 6,043,757 | A | * | 3/2000 | Patrick .......................... 340/963 |
| 6,133,867 | A | * | 10/2000 | Eberwine et al. ............... 342/29 |
| 7,308,388 | B2 | * | 12/2007 | Beverina et al. .................. 703/6 |

* cited by examiner

*Primary Examiner* — Richard Camby
(74) *Attorney, Agent, or Firm* — Donna P. Suchy; Daniel M. Barbieri (57) ABSTRACT

A vehicle system for determining an object threat level, includes a display and electronics configured to receive mission context data indicating an operational state of the vehicle. The electronics determines a threat level of the object in response to the mission context data. The electronics determines at least one recommended action in response to the threat level. The electronics provides an indication of the threat level and at least one recommended action to the display.

20 Claims, 8 Drawing Sheets

SYSTEM AND METHOD FOR DETERMINING AN OBJECT THREAT LEVEL

BACKGROUND

The present disclosure relates generally to the field of data assessment in a vehicle. More particularly, the disclosure relates to decision support systems configured assist a vehicle user.

Conventionally, vehicle operators (e.g., aircraft pilots, ground vehicle drivers, etc.) make decisions in response to instruments, in response to received or observed data, and based on experience. Such decisions can include navigation decisions, usage of vehicle systems, target engagement, terrain avoidance, etc. Data output by instrumentation typically provides data regardless of context and the vehicle operator must infer the value and proper usage of the data. The number of decisions made by the vehicle operators can result in human error and results in a high learning curve for new users.

What is needed is a system and method for providing a vehicle operator with decision support information. What is also needed is a system and method for reducing human error by vehicle operators. What is further needed is a system and method for reducing the learning curve of a vehicle operator. What is needed further still is a system and method capable of automatically providing information to vehicle crew or passengers without operator input.

SUMMARY

One exemplary embodiment relates to a vehicle system for determining an object threat level. The system includes a display and electronics configured to receive mission context data indicating an operational state of the vehicle. The electronics determines a threat level of the object in response to the mission context data. The electronics determines at least one recommended action in response to the threat level. The electronics provides an indication of the threat level and at least one recommended action to the display.

Another exemplary embodiment relates to a method for determining an object threat level to a vehicle. The method includes receiving mission context data indicating an operational state of the vehicle at electronics, determining a threat level of the object in response to the mission context data using the electronics, determining at least one recommended action in response to the threat level using the electronics, and providing an indication of the threat level and at least one recommended action from the electronics to a display.

Another exemplary embodiment relates to a vehicle system for determining an object threat level. The system includes means for receiving mission context data indicating an operational state of the vehicle, means for determining a threat level of the object in response to the mission context data, means for determining at least one recommended action in response to the threat level, and means for providing an indication of the threat level and at least one recommended action.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present disclosure will become apparent from the following description, appended claims, and the accompanying exemplary embodiments shown in the drawings, which are briefly described below.

DETAILED DESCRIPTION

Before describing in detail the particular improved system and method, it should be observed that the invention includes, but is not limited to, a novel structural combination of conventional data/signal processing components and display components, and not in the particular detailed configurations thereof. Accordingly, the structure, methods, functions, control and arrangement of conventional components software, and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

Referring generally to the figures, a system and method for determining an object threat level to a vehicle is shown. The system and method may provide decision support to the vehicle operator. The system can include an electronic display, user interface elements, and electronics. The electronics receives mission context data from at least one source, such as a radar system, a communication system, or from other aircraft systems (e.g., pressure sensors, lightning sensors, GPS/INS sensors, etc.). The mission context data may include, but is not limited to, data relating to: terrain, traffic, weather elements, friendly/enemy forces (e.g., number, movement and composition), flight plan, aircraft performance, pilot preferences, airline preferences/rules, phase of flight, time of day, passenger status, etc. Using the mission context data, the electronics can determine a threat level to the air or ground vehicle in its current mission context. Based on the determined threat level and mission context data, the electronics may determine a recommended action. For example, the electronics may recommend an alternate route, may recommend staying on the current course, may recommend alerting the crew or passengers, may recommend engaging the object, etc. The electronics provides an indication of the threat level and the recommended action to the vehicle operator as a graphic via the display system. The operator may provide input to the user interface elements to confirm, adjust, or deny the recommendation or to query for the reasoning of the threat level and recommended action.

Figure 1:
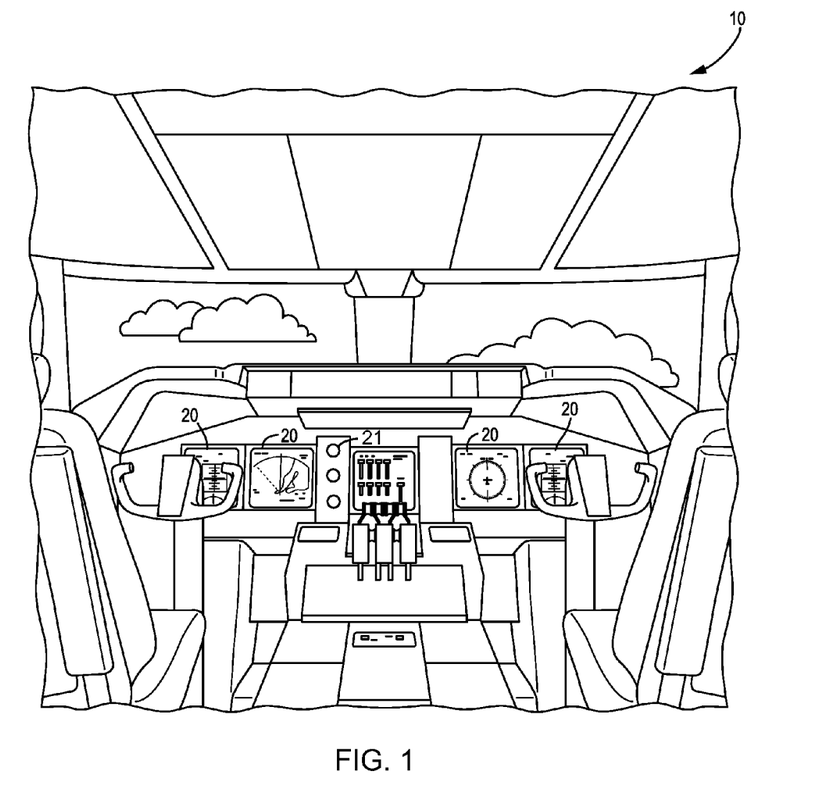
FIG. 1 is an illustration of an aircraft control center or cockpit, according to an exemplary embodiment.

Referring to FIG. 1, an illustration of an aircraft control center or cockpit 10 is shown, according to one exemplary embodiment. Aircraft control center 10 includes flight displays 20. Flight displays 20 can be used to provide information to the flight crew, thereby increasing visual range and enhancing decision-making abilities. According to an exemplary embodiment, at least one of the displays of the flight displays 20 is configured to provide an indication to a flight crew as to whether the terrain features displayed on the electronic display are correct or incorrect.

In an exemplary embodiment, flight displays 20 can provide an output from a radar system of the aircraft. Flight displays 20 can include a weather display, a joint display, a weather radar map and a terrain display. Further, flight displays 20 may include an electronic display or a synthetic vision system (SVS). For example, flight displays 20 can include a display configured to display a three dimensional perspective image of terrain and/or weather information. Other view of terrain and/or weather information may also be provided (e.g. plan view, horizontal view, vertical view, etc.). Additionally, flight displays 20 can be implemented using any of a variety of display technologies, including CRT, LCD, organic LED, dot matrix display, and others. Flight displays 20 can also include head-up displays (HUD) with or without a projector.

Aircraft control center 10 additionally includes one or more user interface (UI) elements 21. UI elements 21 can include dials, switches, buttons, touch screens, mouse controls, or any other user input device. UI elements 21 can be used to adjust features of flight displays 20, such as contrast, brightness, width, and length. UI elements 21 can also (or alternatively) be used by an occupant to interface with or change the displays of flight displays 20. UI elements 21 can additionally be used to acknowledge or dismiss an indicator provided by flight displays 20. Further, UI elements 21 can be used to correct errors on the electronic display.

Displays 20 may be configured to display mission context specific information according to the current operational state of the vehicle. Parameters which make up the mission context can include, but are not limited to: terrain, traffic, weather elements, friendly/enemy forces (e.g., number, movement and composition), flight plan, aircraft performance, pilot preferences, airline preferences/rules, phase of flight, time of day, passenger status, etc. The mission context may then be used to direct processing, manage database access, determine actions, and control active sensors as will be described in greater detail below. Likewise, the functionality of UI elements 21 may change based on the mission context.

Figure 2:
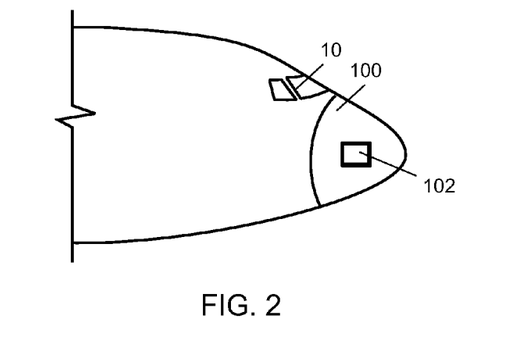
FIG. 2 shows the front of an aircraft with an aircraft control center and nose, according to an exemplary embodiment.

Referring to FIG. 2, the front of an aircraft is shown with aircraft control center 10 and nose 100, according to an exemplary embodiment. A radar system 102 is generally located inside nose 100 of the aircraft or inside a cockpit of the aircraft. According to other exemplary embodiments, radar system 102 can be located on the top of the aircraft or on the tail of the aircraft. Yet further, radar system 102 can be located anywhere on the aircraft. Furthermore, the various components of radar system 102 can be distributed at multiple locations throughout the aircraft. Additionally, radar system 102 can include or be coupled to an antenna system of the aircraft. Data from radar system 102 may be used for mission context illustration on display 20.

Figure 3:
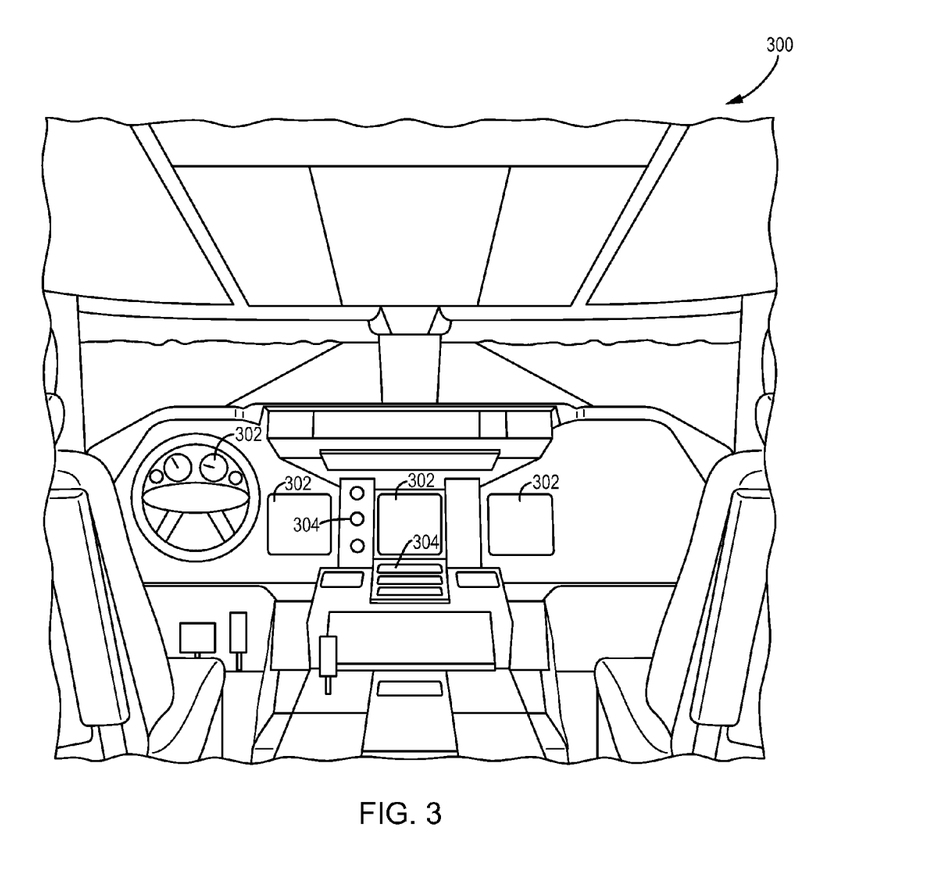
FIG. 3 is an illustration of a ground vehicle control center or dashboard, according to an exemplary embodiment.

Referring to FIG. 3, an illustration of a ground vehicle control center or dashboard 300 is shown, according to another exemplary embodiment. Control center 300 includes displays 302. Displays 302 can be used to provide information to the driver or crew, thereby increasing visual range and enhancing decision-making abilities. According to an exemplary embodiment, at least one of displays 302 is configured to provide an indication to a flight crew as to whether graphical/textual features displayed on the electronic display are correct or incorrect.

In an exemplary embodiment, displays 302 can provide an output from vehicle or engine sensors and/or can provide data received from other vehicles or ground stations. Displays 302 can include vehicle instrument displays. Further, displays 302 may include an electronic display or a synthetic vision system (SVS). For example, displays 302 can include a display configured to display a three dimensional perspective image of terrain, roadways, and/or information related to other vehicles. The information related to other vehicles can include an indication of friendly or enemy, vehicle type, vehicle speed, vehicle capability or firing range, etc. Displays 302 can be implemented using any of a variety of display technologies, including CRT, LCD, organic LED, dot matrix display, and others. Displays 20 can also include head-up displays (HUD) with or without a projector, helmet mounted displays (HMD), or visor displays.

Control center 300 additionally includes one or more user interface (UI) elements 304. UI elements 304 can include dials, switches, buttons, touch screens, mouse controls, or any other user input device. UI elements 304 can be used to adjust features of flight displays 302, such as contrast, brightness, width, and length. UI elements 304 can also (or alternatively) be used by an occupant to interface with or change the displays of flight displays 302. UI elements 304 can additionally be used to acknowledge or dismiss an indicator provided by flight displays 302. Further, UI elements 304 can be used to correct errors on an electronic display 302.

Displays 302 may be configured to display mission context specific information according to the current operational state of the vehicle. Parameters which make up the mission context can include, but are not limited to: terrain, traffic, weather elements, friendly/enemy forces (e.g., number, movement and composition), route, vehicle performance, driver preferences, military preferences/rules, time of day, etc. The mission context may then be used to direct processing, manage database access, determine actions, and control active sensors as will be described in greater detail below. Likewise, the functionality of UI elements 304 may change based on the mission context.

While a specific number of displays 20, 302 and UI elements 21, 304 are illustrated in FIGS. 1 and 3, according to other exemplary embodiments, more or fewer than the illustrated number of displays and UI elements may be used. While specific locations of displays 20, 302 and UI elements 21, 304 are illustrated in FIGS. 1 and 3, according to other exemplary embodiments, the displays and UI elements may be mounted or located at any position within the vehicle.

Figure 4:
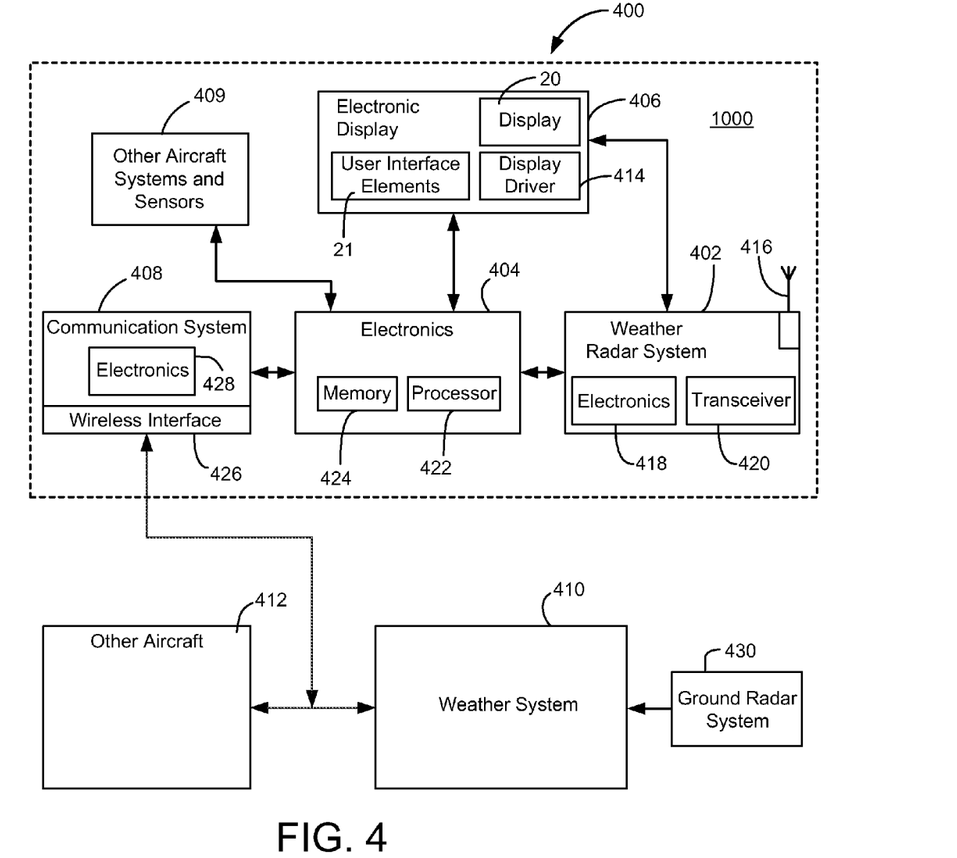
FIG. 4 is a block diagram of a decision support system, according to an exemplary embodiment.

Referring to FIG. 4, an aircraft decision support system (DSS) 400 (e.g., for mounting in or with communication to cockpit 10) is shown, according to an exemplary embodiment. System 400 is shown to include a weather radar system 402, electronics 404, an electronic display system 406, a communication system 408, and other aircraft systems and sensors 409 (e.g., pressure sensors, lightning sensors, GPS/INS sensors, etc.). Weather radar system 402 is generally configured to cast one or more radar beams from an aircraft mounted antenna, to receive returns, and to interpret the returns (e.g. for display to a user, for transmission to an external weather system, etc.). Additionally, weather radar system 402 can perform multiple radar sweeps. The radar sweeps can include horizontal sweeps, vertical sweeps, or a combination of horizontal and vertical sweeps. Furthermore, the radar sweeps can be performed such that they are substantially orthogonal to one another. According to other exemplary embodiments, weather radar system 402 can be a monopulse radar system or a radar system with an aperture capable of switching modes.

Electronic display system 406 can be used to display information from weather radar system 402, from weather system 410, from aircraft 412, from electronics 404, or other electronic equipment. Electronic display system 406 can include user interface (UI) elements 21, display 20, and a display driver 414. Display driver 414 can be any computer hardware and/or software that enables electronic display system 406 to communicate with and receive data from various other components. UI elements 21 can be used for selection of data shown on display 20 or to apply corrections to data shown on display 20. For example, UI elements 21 may be used to select mission context specific actions or to query data corresponding to context specific alerts from electronics 404. Input received from UI elements 21 is processed by display driver 414. Display driver 414 may then communicate the received input to electronics 404 or various other components.

Weather radar system 402 can be a system for detecting weather patterns. Detected weather patterns can be communicated to electronic display system 406 for display to the flight crew. Detected weather patterns may instead or may also be provided to electronics 404 for further analysis or for transmission to an external weather system 410 or another aircraft 412 via communication system 408. Weather radar system 402 can provide weather related information to electronic display 406 and/or electronics 404. Weather radar system 402 includes an antenna 416, electronics 418, and a transceiver 420. Transceiver 420 is configured to transmit radar signals via antenna 416 and to receive radar returns via antenna 416.

Antenna 416 can be used to perform a radar sweep for detecting weather information. In addition to use for weather detection, antenna 416 can also receive return signals from ground/terrain features. The tilt of antenna 416 can be controlled thereby enabling multiple steered radar sweeps to be cast at multiple tilt angles. For example, antenna 416 may be directed specifically towards a specific region of the surrounding area.

Weather radar system 402 may be any automatic radars, for example as commercially available from Rockwell Collins, Inc. of Cedar Rapids, Iowa. Automatic radars have standardized antenna patterns, standardized ground clutter rejection algorithms, and the ability to interrupt normal horizontal antenna sweeps with configurable auxiliary antenna sweeps in either elevation or in azimuth. These characteristics may be advantageously used to supplement data received from a ground radar.

Electronics 418 may be any hardware and/or software processor or processing architecture capable of executing instructions and processing radar returns. Any of the radar returns available to electronics 418 can be provided to electronics 404 for further processing. For example, electronics 418 may be configured to examine return data from antenna 416, thereby determining regions of weather activity. Electronics 418 may also be used to send electrical signals to antenna 416 in order to tilt antenna 416 and steer a radar sweep. Further, processing electronics 418 may be configured to construct a weather radar map based upon radar returns. The constructed weather radar map may be output to electronics 404 for further analysis. The constructed weather radar map may instead or may also be output to electronic display 406.

Electronics 404 may be configured to analyze data received from radar system 402, analyze data received from other systems and sensors 409, or to facilitate transmission of radar data from weather system 410 or other aircraft 412 via communication system 408. Electronics 404 includes a processor 422 and a memory 424. Processor 422 may be any hardware and/or software processor or processing architecture capable of executing instructions (e.g., computer code stored in memory 424) and operating on various data types. Memory 424 may be any volatile or non volatile memory or database configured to store instructions or operations for execution by processor 422. Alternatively, memory 424 may be configured to store radar data received from communication system 408 or from radar system 402. Memory 424 may also store rule sets uses by processor 422 to determine data priority.

Processing electronics 404 may be able to determine weather or terrain types using radar range information, azimuth information, and elevation information provided by weather radar system 402. For example, processing electronics 404 may determine the presence of a convective cell due to radar data indicating high reflectivity or turbulence. Processing electronics 404 may also identify convective cells based on radar return data received from weather system 410 or aircraft 412 via communication system 408.

Communication system 408 is configured to establish a datalink with weather system 410 and/or aircraft 412. Communication system 408 is configured to receive radar data or from weather system 4010 or aircraft 4012. Communication system 408 includes a wireless communication interface 426 configured to facilitate communication between weather system 410 or aircraft 412 and system 400. Wireless communication interface 426 may be any interface capable of sending and receiving data using a radio frequency (RF) signal. Communication system 408 may also include electronics 428 configured to parse, encrypt, or prepare data into an appropriate format for transmission by interface 426. Electronics 428 may also be configured to assemble, decrypt, or otherwise analyze data received by interface 426 for use by processing electronics 404. It is noted that while the Figures illustrate direct communication with weather system 410 and aircraft 412, according to other exemplary embodiments, communication may be routed via one or more satellites or other third party relays within the line of sight of the aircraft.

According to various exemplary embodiments, electronics 404 of DSS 400 may operate in response to a mission context corresponding to the current operational state of the vehicle (airborne or ground). Parameters that make up the mission context may include, but not be limited to: terrain, traffic, weather elements, number, movement and composition of friendly/enemy forces, flight plan, aircraft performance, pilot preferences, airline preferences/rules, phase of flight, time of day, passenger status, etc. Electronics 404 then uses the mission context to direct processing, manage access to memory/database 424, determine recommended actions to the pilot, and control active sensors (e.g., antenna 416, sensors 409, etc.).

For example, electronics 404 may be configured to prioritize data processing. Electronics 404 may choose which rule set stored in memory 424 to use to process and fuse weather information from radar system 402, aircraft 412, or ground system 410. Electronics 404 can then determine which data to give priority execution to.

Electronics 404 may be configured to queue active sensors (e.g., antenna 416, sensors 409, etc.) to identifying higher priority regions of the environment to monitor. For example, electronics 404 may direct the sweep of antenna 416 of onboard weather radar 402 or may steer an on-vehicle infrared camera of systems and sensors 409.

Electronics 404 may be configured to manage the resolution needs of underlying data. For example, electronics 404 may monitor and adjust the scanning resolution and display resolution of terrain, weather, obstacles, and other objects.

Electronics 404 may be configured to dynamically adjust or set object threat levels based on mission context. For example, when an aircraft is on final approach for a landing at an airport, light turbulence may be acceptable. However, such turbulence may not be acceptable when high ride quality is desired, such as when the aircraft is cruising and is carrying sleeping passengers.

Electronics 404 may use a threat cost function to determine if hazard items with softer boundaries, such as ride quality turbulence, should be selectively displayed or should have different (e.g. muted, transparent) graphics. The threat cost functions used by electronics 404 may take into account parameters such as the location of the vehicle, environment within the cabin (e.g., beverage service, sleeping passengers, etc.), severity and boundaries of the sensed or up-linked (from system 410 or aircraft 412) hazard areas, and phase of flight (i.e. the mission context). Electronics 404 may then select the appropriate form to annunciate the threat to the vehicle operators. Electronics 404 may select an appropriate annunciation form to correspond to a change in a threat display threshold level (e.g. "always avoid" or "not a severe hazard"). The threat cost functions employed by electronics 404 may be based on airline flight operation rules (e.g. discontinue beverage service when in cruise and moderate turbulence is detected ahead, fasten seatbelts when beginning approach, etc.) or based on military standard operating procedures (SOPs).

In some exemplary embodiments, the vehicle operator may query the regions that DSS 400 indicated as being a threat (e.g., regions that are diminished or enhanced, re-routed vehicle trajectory, etc.) for reasons why the regions are a threat. The query may be made, for example, by using a UI element 21 to switch to a DSS view that provides the reasons as annotations or by allowing the operator to move a cursor UI element 22 and select the area to display a dialog box showing the reasons.

Electronics 404 may adjust the relative weighting between hazards detected by onboard equipment sensors (e.g. weather radar 402, electromagnetic intelligence (ELINT) packages, other systems or sensors 409, etc.) and hazards or data received from external sources (e.g. ground based weather radar 410, aircraft 412, etc.) depending on the mission context. Such adjustment may allow electronics 404 to dynamically change the scope of data fusion between all data sources.

In some exemplary embodiments, electronics 404 may automatically annunciate alerts in response to the present mission context and received weather radar 402, 410 data or other sensor 409 data. For example, electronics 404 may automatically provide audible and/or visual messages or indicators to flight attendants to stow beverage carts. Electronics 404 may also automatically provide audible and/or visual messages or indicators to passengers to fasten their seat belts (e.g., turning on the "fasten seat belt" signs).

While decision support system 400 is generally described and illustrated as being used in an aircraft, according to other exemplary embodiments, a similar system may be used in a ground vehicle (e.g., mounted in or with communication to control center 300). In such embodiments, weather radar system 402 may be omitted, however much of the same data may be received via communication system 408 and many of the same functions may be performed by processing electronics 404. Further, while mission context processing may be used as a threat object/information repository to a human piloted/controlled vehicle, in other exemplary embodiments, the mission context processing may be used with unpiloted vehicles. In such embodiments, the recommendations of the electronics may be automatically carried out or may be confirmed, denied, or adjusted remotely by personnel.

Figure 5:
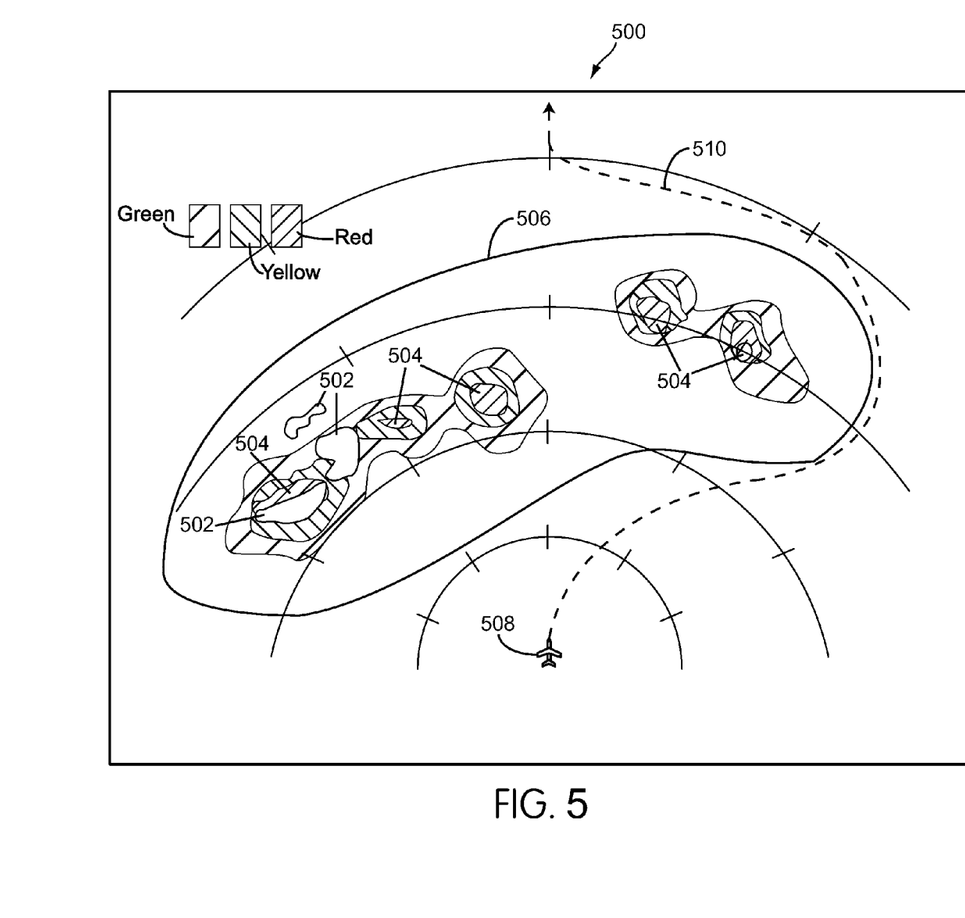
FIG. 5 is a schematic illustration of a radar map, according to an exemplary embodiment.

Referring to FIG. 5, a screenshot 500 of display 20 provides reflectivity scaled as moisture content and turbulence 502 scaled to RMS vertical load on a radar map according to an exemplary embodiment. The weather data may be received from weather radar system 402, from uplinked data from a ground station, or from data sent from other aircraft. The moisture content may be illustrated by the colors green, yellow, and red (represented by the legend in the FIG.) and turbulence 502 may be represented as another color such as magenta or, alternatively, may not be explicitly represented. The display of reflectivity provides an indication of the location of convective cell cores 504. The collection of cells 504 may make up a weather macro region 506. It may be desirable for an aircraft 508 to avoid region 506 via an alternate route 510 for various mission context specific reasons. Alternatively, aircraft 508 may proceed on an alternate route through region 506 while avoiding cells 504.

For example, if aircraft 508 is a passenger aircraft that is cruising for a long distance at nighttime, the passengers are likely to be asleep. In such a scenario, it may be desirable for aircraft 508 to avoid cells 504, turbulence 502, and/or region 506 in order to avoid turbulence so that the passengers may sleep better. Decision support system 402 of aircraft 508 may automatically propose route 510 for pilot consideration. However, if aircraft 508 is on approach to a runway, light turbulence may be acceptable and aircraft 508 may not propose an alternate route.

Aircraft 508 may use a threat cost function to determine if hazard items (e.g., cell 504, turbulence 502, region 506, etc.) with softer boundaries, such as ride quality turbulence, ought to be selectively displayed on display 20 or have different (e.g. muted) graphics. The threat cost functions may take into account parameters such as the location of the vehicle, environment within the cabin (e.g., beverage service, sleeping passengers, etc.), severity and bounds of the sensed or uplinked hazard areas, phase of flight—i.e. the mission context—and then select the appropriate form to annunciate the threat to the vehicle operators (e.g. pilots). This selection of an appropriate annunciation form could be embodies as a change in threat display threshold level (e.g. "always avoid" or "not a severe hazard"). The threat cost functions could be based on airline flight operation rules, e.g. discontinue beverage service when in cruise and moderate turbulence is detected ahead, or on military standard operating procedures (SOPs).

In some exemplary embodiments, the pilot may query the regions that the decision support systems have diminished, enhanced, or re-routed the vehicle trajectory, to query for the reasons the alert was made. This could be achieved, for example, by switching to a "DSS view" that provides annotations to the reasons or by allowing the operator to move a cursor and select the area in order to display a dialog box showing these reasons.

Figure 6:
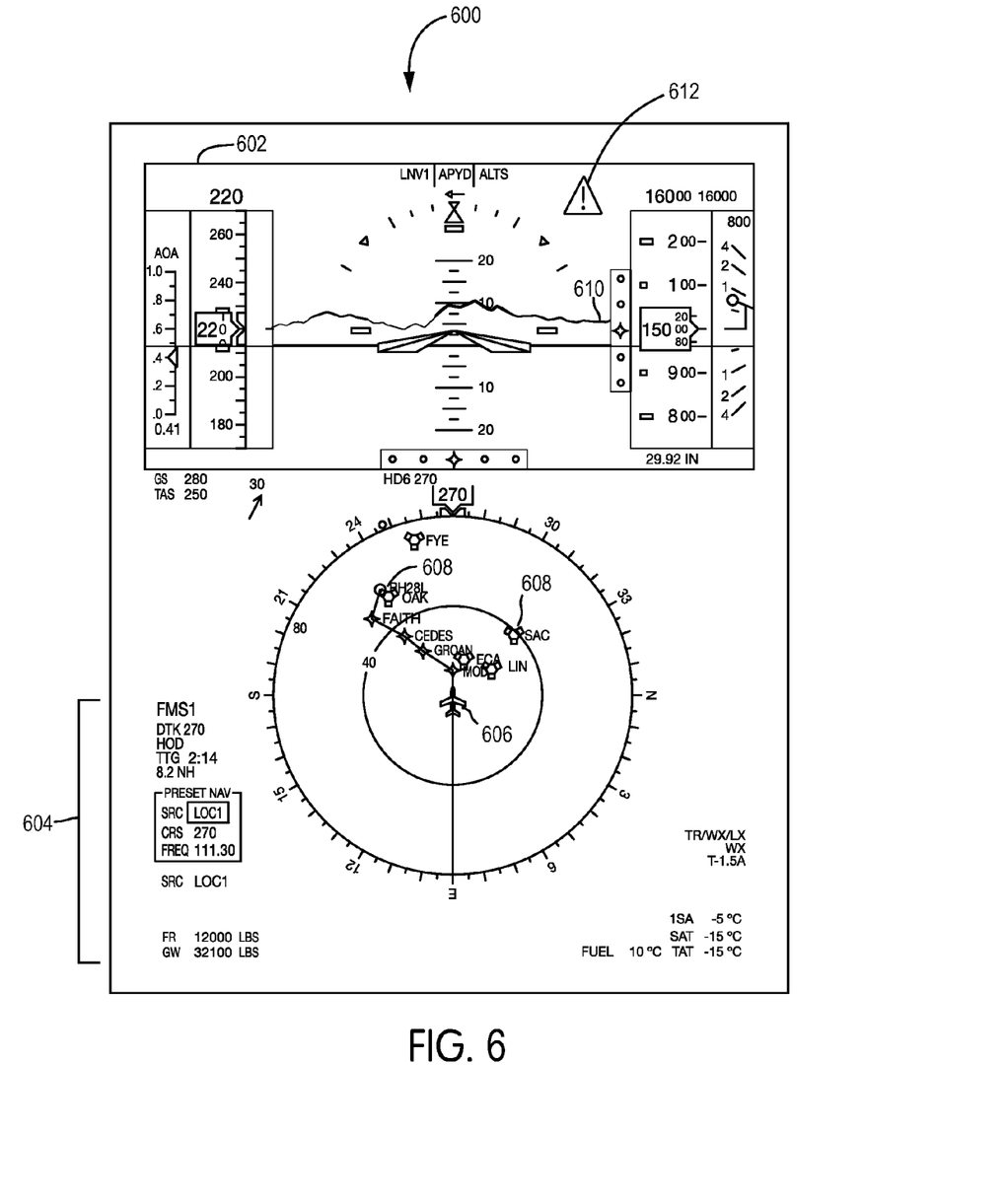
FIG. 6 is an illustration of a display screen, according to an exemplary embodiment.

Referring to FIG. 6, an electronic display 600 is shown, according to another exemplary embodiment. Electronic display 600 may include a three-dimensional perspective image 602 and flight characteristics display 604. Flight characteristics display 604 includes airplane position 606 and navaids 608. Electronic display 600 includes a terrain view 610 that illustrates varying levels of terrain. According to an exemplary embodiment, the color of terrain 610 may be configured to be different colors to allow the aircrew to quickly recognize a potential hazard. In another exemplary embodiment, high terrain may be configured to flash, enlarge, turn red or any combination thereof to provide a warning signal to the aircrew. Furthermore, electronic display 600 may be configured to provide an indicator 612 as to whether terrain features displayed are correct or incorrect. Indicator 612 can be an icon, text, string, symbol, synthetic image, LED indicator, audible tone, or any other visible and/or audible alarm provided by electronic display 600, another aircraft display, an audio system, etc. Decision support system 400 can be configured to flash the indicator, enlarge the indicator, change colors of the indicator, display text, or any combination thereof based on mission context hazard or threat data. Decision support system 400 can also be configured to cause a speaker or an audio system to provide an audible indication.

Figure 7:
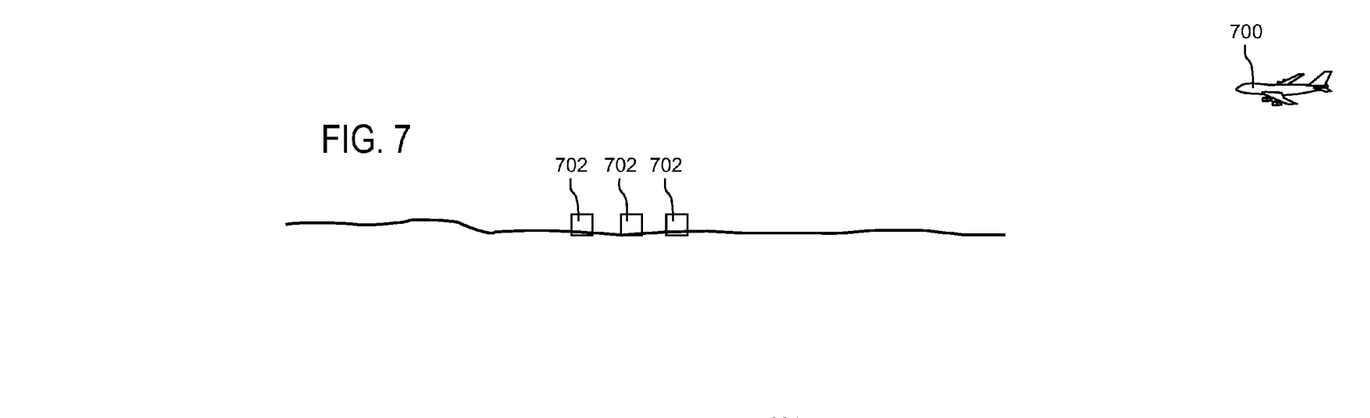
FIG. 7 is a schematic illustration of a vehicle approaching possible ground threats or targets, according to an exemplary embodiment.

Referring to FIG. 7, a vehicle 700 is shown approaching several possible ground threats or targets 702, according to an exemplary embodiment. Vehicle 700 may detect targets 702 using radar system 402, in response to intercepted radio signals at communication system 408, or in response to data received from ground or airborne stations via communication system 408. Based on the mission context, DSS 400 may determine a threat level of targets 702 or may determine weather targets 702 are enemy or friendly. For example, DSS 400 may determine the threat level in response to data indicating a time of day, movement direction, movement speed, location, friendly/enemy radio signature, number/volume/formation of targets 702, effective range of targets 702, etc. Certain targets 702 may have a greater range of sight and be a greater threat during the day as compared to the night. Targets moving towards vehicle 700, especially with great speed, may pose more of a threat. The speed of targets 702 (or lack thereof), the location of targets 702, and the number/volume/formation of targets 702 may be used to determine a classification of the target. For example the classification may be a passenger aircraft, a military aircraft, a ground structure, a ground based weapon, an unarmed ground vehicle, an armed ground vehicle, etc. The classification may also be used to determine the threat level of targets 702. In response to the threat level determined by DSS 400, an audible or visual indicator may be provided to the operator of vehicle 700. DSS 400 may provide a location and color coded indication of the threat levels of targets 702 or may provide alternate flight paths or routes around or over targets 702.

Figure 8:
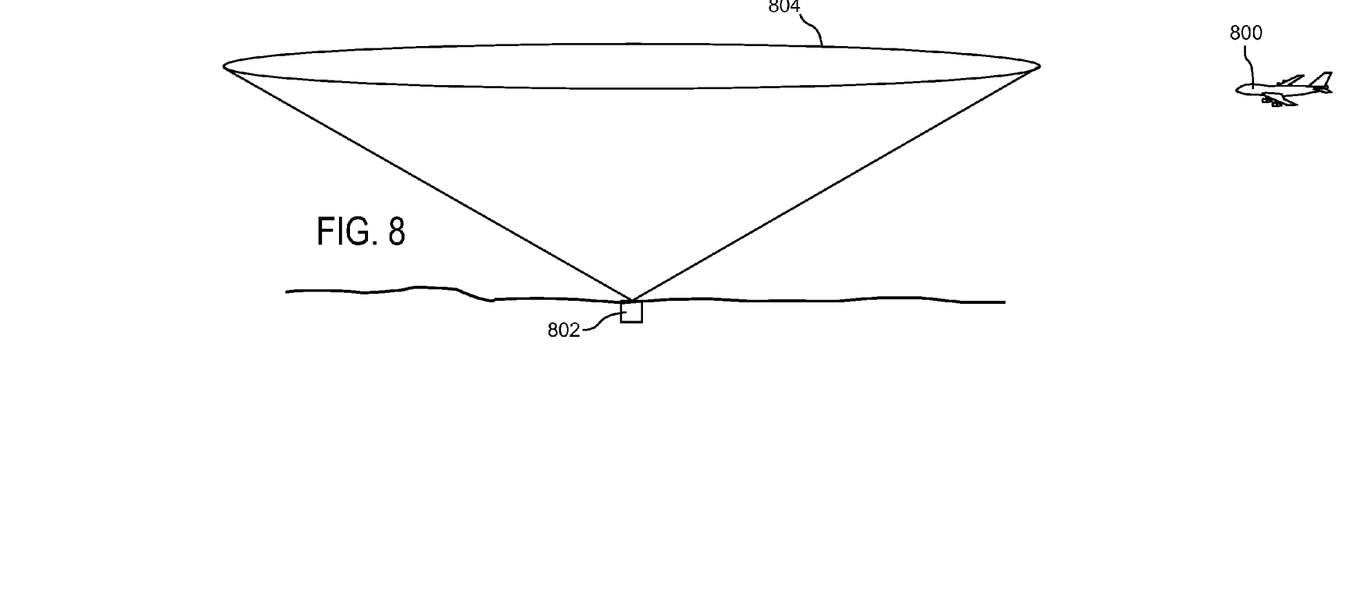
FIG. 8 is a schematic illustration of a vehicle approaching a possible ground threat, according to another exemplary embodiment.

Referring also to FIG. 8, a vehicle 800 is shown approaching a detected ground threat or targets 802, according to an exemplary embodiment. Based on a determined classification of target 802, DSS 400 may receive data indicating or may determine that target 802 has a predetermined effective weapon range 804. Based on effective range 804 and any other mission context data available (as described above), DSS 400 may provide indications of a threat level of target 802 or may provide alternate paths or routes around or over effective range 804 of target 802. While vehicles 700 and 800 are illustrated as being aircraft, according to other exemplary embodiments, vehicles 700 and 800 may be ground vehicles.

Figure 9:
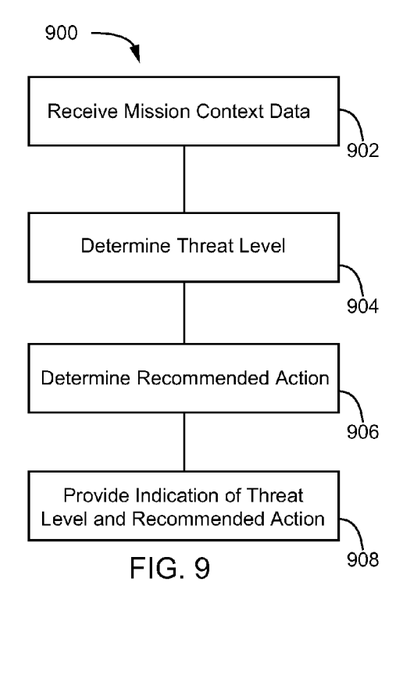
FIG. 9 is a flowchart of a method for providing decision support to a vehicle operator based on a mission context, according to an exemplary embodiment.

Referring to FIG. 9, a method 900 is configured to provide decision support to a vehicle operator using DSS 400, according to an exemplary embodiment. Electronics 404 receives mission context data from at least one source (step 902). For example, electronics 404 may receive mission context data from weather radar system 402, via communication system 408, or from other aircraft systems or sensors 409 (e.g., pressure sensors, lightning sensors, GPS/INS sensors, etc.). The mission context data may include, but is not limited to, data relating to: terrain, traffic, weather elements, friendly/enemy forces (e.g., number, movement and composition), flight plan, aircraft performance, pilot preferences, airline preferences/rules, phase of flight, time of day, passenger status, etc. Using the mission context data, electronics 404 can determine a threat level to the air or ground vehicle in its current mission context (step 904). Based on the determined threat level and mission context data, electronics 404 may determine a recommended action (step 906). For example, electronics 404 may recommend an alternate route, may recommend staying on the current course, may recommend alerting the crew or passengers, may recommend engaging a threat object, etc. Electronics 404 provides an indication of the threat level and the recommended action to the vehicle operator as a graphic via display system 406 and/or as an audible alert via a speaker (step 908).

Figure 10:
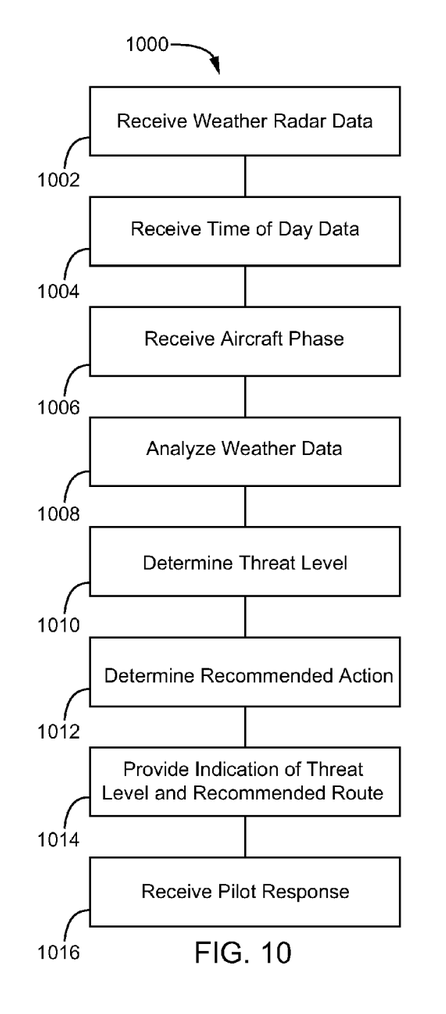
FIG. 10 is a flowchart of a method for providing a navigational recommendation to an aircraft pilot based on a mission context, according to an exemplary embodiment.

Referring to FIG. 10, a method 1000 is configured to provide a navigational recommendation to an aircraft pilot based on a mission context, according to an exemplary embodiment. Electronics 404 receives weather radar data either from weather radar 402 or from ground station 410 or aircraft 412 via communication system 408 (step 1002). Electronics 404 also receives time of day data from systems and sensors 409 (e.g., a GPS system, an onboard clock, etc.) or from ground station 410 or aircraft 412 via communication system 408 (step 1004). Electronics 404 further receive an aircraft phase from systems and sensors 409 (e.g., a flight management system, a GPS/INS system, etc.) (step 1006). For example, electronics 404 may receive an indication of a takeoff, climb, cruise, or descent/approach aircraft phase. While steps 1002, 1004, and 1006 are illustrated as being in a particular sequential order, according to various exemplary embodiments, steps 1002, 1004, and 1006 may be performed in any order, in parallel, or in a combination of parallel and sequential steps.

Electronics 404 analyzes the received weather radar data to determine areas where turbulence, convective cells, or lightning may exist (step 1008). Using the analyzed weather data, the time of day, and aircraft phase mission context data, electronics 404 can determine a threat level to the aircraft in its current mission context (step 1010). Based on the determined threat level and mission context data, electronics 404 may determine a recommended action (step 1012). For example, electronics 404 may recommend an alternate route (in elevation or latitude/longitude) if the threat for turbulence is above a predetermined threshold, the aircraft is cruising, and passengers are determined to be sleeping (because of time of day). In an alternative example, electronics may recommend staying on the current course and alerting the crew to discontinue beverage service if the threat for turbulence is above a predetermined threshold.

Electronics 404 provides an indication of the threat level and the recommended action to the pilot as a graphic via display system 406 and/or as an audible alert via a speaker (step 1014). Once the pilot receives the indications, he or she may input a response to the recommendation (step 1016). For example, the pilot may confirm, adjust, or deny the recommended action via UI elements 21. In another example, the pilot may query for the reasoning behind the threat level and recommended action via UI elements 21.

Figure 11:
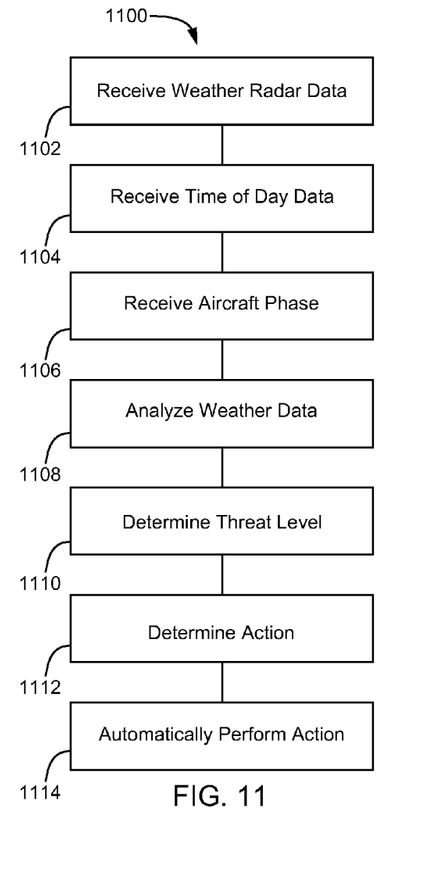
FIG. 11 is a flowchart of a method for automatically providing an indication to a flight crew or passengers based on a mission context, according to an exemplary embodiment.

Referring to FIG. 11, a method 1100 is configured to automatically providing an indication to a flight crew or passengers based on a mission context, according to an exemplary embodiment. Electronics 404 receives weather radar data either from weather radar 402 or from ground station 410 or aircraft 412 via communication system 408 (step 1102). Electronics 404 also receives time of day data from systems and sensors 409 (e.g., a GPS system, an onboard clock, etc.) or from ground station 410 or aircraft 412 via communication system 408 (step 1104). Electronics 404 further receive an aircraft phase from systems and sensors 409 (e.g., a flight management system, a GPS/INS system, etc.) (step 1106). For example, electronics 404 may receive an indication of a takeoff, climb, cruise, or descent/approach aircraft phase. While steps 1002, 1004, and 1006 are illustrated as being in a particular sequential order, according to various exemplary embodiments, steps 1002, 1004, and 1006 may be performed in any order, in parallel, or in a combination of parallel and sequential steps.

Electronics 404 analyzes the received weather radar data to determine areas where turbulence, convective cells, or lightning may exist (step 1108). Using the analyzed weather data, the time of day, and aircraft phase mission context data, electronics 404 can determine a threat level to the aircraft in its current mission context (step 1110). Based on the determined threat level and mission context data, electronics 404 may determine an action to take (step 1112) and automatically carry out that action. For example, electronics 404 may automatically illuminate a "fasten seat belts" sign and/or provide an audible alert to passengers without pilot intervention if the threat for turbulence is above a predetermined threshold. In another example, electronics 404 may automatically alert the crew to discontinue beverage service without pilot intervention if the threat for turbulence is above a predetermined threshold.

Figure 12:
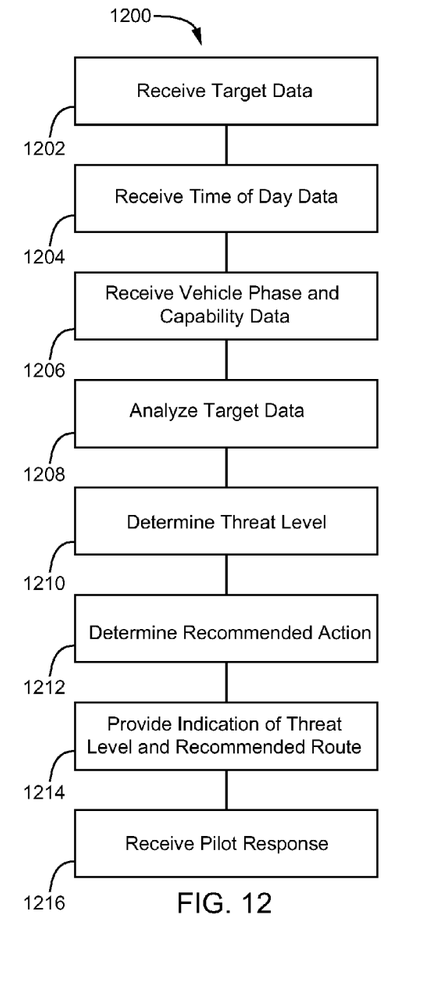
FIG. 12 is a flowchart of a method for providing threat/target decision support to a vehicle based on a mission context, according to an exemplary embodiment.

Referring to FIG. 12, a method 1200 is configured to provide threat/target decision support to a vehicle based on a mission context, according to an exemplary embodiment. Electronics 404 receives target data (e.g., for targets 702 or 802) from ground station 410 or aircraft 412 via communication system 408 or from a system or sensor 409 on the vehicle (e.g., a target identification system) (step 1202). Electronics 404 also receives time of day data from systems and sensors 409 (e.g., a GPS system, an onboard clock, etc.) or from ground station 410 or aircraft 412 via communication system 408 (step 1204). Electronics 404 further receives vehicle phase and capability data from systems and sensor 409 (e.g., a flight management system, a GPS/INS system, etc.) (step 1206). For example, if the vehicle is an aircraft, electronics 404 may receive an aircraft phase, and if the vehicle is a ground vehicle, electronics 404 may receive heading, speed, and track data. Electronics 404 may also receive an indication as to the capabilities of the vehicle (e.g., maneuverability, top speed, weapon systems, etc.). While steps 1002, 1004, and 1006 are illustrated as being in a particular sequential order, according to various exemplary embodiments, steps 1002, 1004, and 1006 may be performed in any order, in parallel, or in a combination of parallel and sequential steps.

Electronics 404 analyzes the received target data to determine a classification and capabilities of the target (step 1208). For example, electronics 404 may determine whether the target is friendly or enemy, what an effective range of the target weaponry is, how maneuverable the target is, etc. Using the analyzed target data, the time of day (for determining visibility) and phase and capability mission context data, electronics 404 can determine a threat level to the vehicle in its current mission context (step 1210). Based on the determined threat level and mission context data, electronics 404 may determine a recommended action (step 1212). For example, electronics 404 may recommend an alternate route (in elevation or latitude/longitude) if the threat is above a predetermined threshold. In another example, electronics may recommend staying on the current course if the threat is below a predetermined threshold. Further, electronics 404 may recommend engaging or destroying the target.

Electronics 404 provides an indication of the threat level and the recommended action to the operator as a graphic via display system 406 and/or as an audible alert via a speaker (step 1214). Once the operator receives the indications, he or she may input a response to the recommendation (step 1216). For example, the pilot may confirm, adjust, or deny the recommended action via UI elements 21 or 304. In another example, the pilot may query for the reasoning behind the threat level and recommended action via UI elements 21 or 304.

Exemplary embodiments may include program products comprising computer or machine-readable media for carrying or having machine-executable instructions or data structures stored thereon. For example, decision support system 400 may be computer driven. Exemplary embodiments illustrated in the methods of FIGS. 9-12 may be controlled by program products comprising computer or machine-readable media for carrying or having machine-executable instructions or data structures stored thereon. Such computer or machine-readable media can be any available media which can be accessed by a general purpose or special purpose computer or other machine with a processor. By way of example, such computer or machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of computer or machine-readable media. Computer or machine-executable instructions comprise, for example, instructions and data which cause a general purpose computer, special purpose computer, or special purpose processing machines to perform a certain function or group of functions. Software implementations of the present invention could be accomplished with standard programming techniques with rule based logic and other logic to accomplish the various connection steps, processing steps, comparison steps and decision steps.

It is also important to note that the construction and arrangement of the components as shown in the various exemplary embodiments is illustrative only. Although only a few embodiments have been described in detail in this disclosure, those skilled in the art who review this disclosure will readily appreciate that many modifications are possible (e.g., variations in dimensions, structures, shapes and proportions of the various elements, mounting arrangements, use of materials, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may be made in the design, operating conditions and arrangement of the various exemplary embodiments without departing from the scope of the present inventions as expressed in the appended claims.

What is claimed is:

1. A vehicle system for determining an object threat level associated with a threat, comprising:
    a display; and
    electronics configured to receive mission context data indicating an operational state of the vehicle and data relating to weather, the electronics determining the object threat level in response to the mission context data, the electronics determining at least one recommended action in response to the object threat level and the operational state of the vehicle, the electronics providing an indication of the object threat level and the at least one recommended action to the display;
    wherein the electronics is configured to provide a representation of the weather on the display, the representation including an indication of the object threat level, wherein the recommended action is a proposed flight path, the proposed flight path avoiding the threat, wherein the proposed flight plan is provided on the display.

2. The system of claim 1, wherein the data related to the weather comprises weather radar data.

3. The system of claim 2, further comprising:
    a weather radar system configured to provide the weather radar data.

4. The system of claim 2, wherein the electronics receives mission context data from multiple sources, the electronics determining a priority for the mission context data from the multiple sources.

5. The system of claim 2, wherein the proposed flight path is depicted as a dashed line.

6. The system of claim 5, wherein the proposed flight path is a route around the threat when the passengers are determined to be or are likely to be sleeping and the threat is light turbulence.

7. The system of claim 1, wherein the electronics determines a priority of multiple threat levels for multiple threats and recommended actions for the multiple threats.

8. The system of claim 1, further comprising:
    a user interface element configured to receive user input related to a query of the threat level or at least one recommended action, the electronics providing an indication of the reasoning for the threat level or at least one recommended action to the display.

9. The system of claim 1, further comprising:
    a user interface element configured to receive user input related to confirmation, revision, or denial of the at least one recommended action.

10. The system of claim 1, wherein the electronics automatically provides at least one of an alert to passengers to fasten safety belts and an alert to flight attendants to discontinue beverage service.

11. The system of claim 1, wherein the vehicle comprises an aircraft or a ground vehicle.

12. A method for determining an object threat level associated with a weather threat to a vehicle, comprising:
    receiving mission context data indicating an operational state of the vehicle at electronics, the mission contest data comprising data related to weather;
    determining the object threat level of the weather threat in response to the data related to the weather using the electronics;
    determining at least one recommended action in response to the object threat level and the operational state using the electronics; and
    providing an indication of the object threat level and the at least one recommended action from the electronics to a display, wherein a representation of the weather is provided on the display, the representation including the indication of the object threat level and wherein the recommended action is a proposed flight path avoiding the weather threat and wherein the proposed flight path is provided on the display.

13. The method of claim 12, wherein the data related to weather comprises weather radar data.

14. The method of claim 13, further comprising:
    determining a priority for mission context data received from multiple sources using the electronics.

15. The method of claim 13, wherein the proposed flight path is depicted as a dashed line.

16. The method of claim 15, wherein the recommended alternate route is a route around the weather threat when the passengers are determined to be or are likely to be sleeping and the weather threat is light turbulence.

17. The method of claim 12, further comprising:
    determining a priority of multiple threat levels and recommended actions for multiple objects using the electronics.

18. The method of claim 12, further comprising:
    receiving user input related to a query of the object threat level or at least one recommended action at a user interface; and
    providing an indication of the reasoning for the threat level or at least one recommended action to the display.

19. The method of claim 12, further comprising:
    automatically providing at least one of an alert to passengers to fasten safety belts and an alert to flight attendants to discontinue beverage service.

20. A vehicle system for determining an object threat level of a weather threat, comprising:
    means for receiving mission context data indicating an operational state of the vehicle and including data related to weather;
    means for determining the object threat level in response to the mission context data;
    means for determining at least one recommended action in response to the object threat level; and
    means for providing an indication of the object threat level and an indication of the at least one recommended action, wherein a representation of the weather is provided on a display, the representation including the indication of the object threat level and wherein the recommended action is a proposed flight path avoiding the weather threat and is provided on the display.

* * * * *